Jan. 3, 1950 R. CHILTON 2,493,571
TOROIDAL TRANSMISSION
Filed Oct. 6, 1944 3 Sheets-Sheet 1
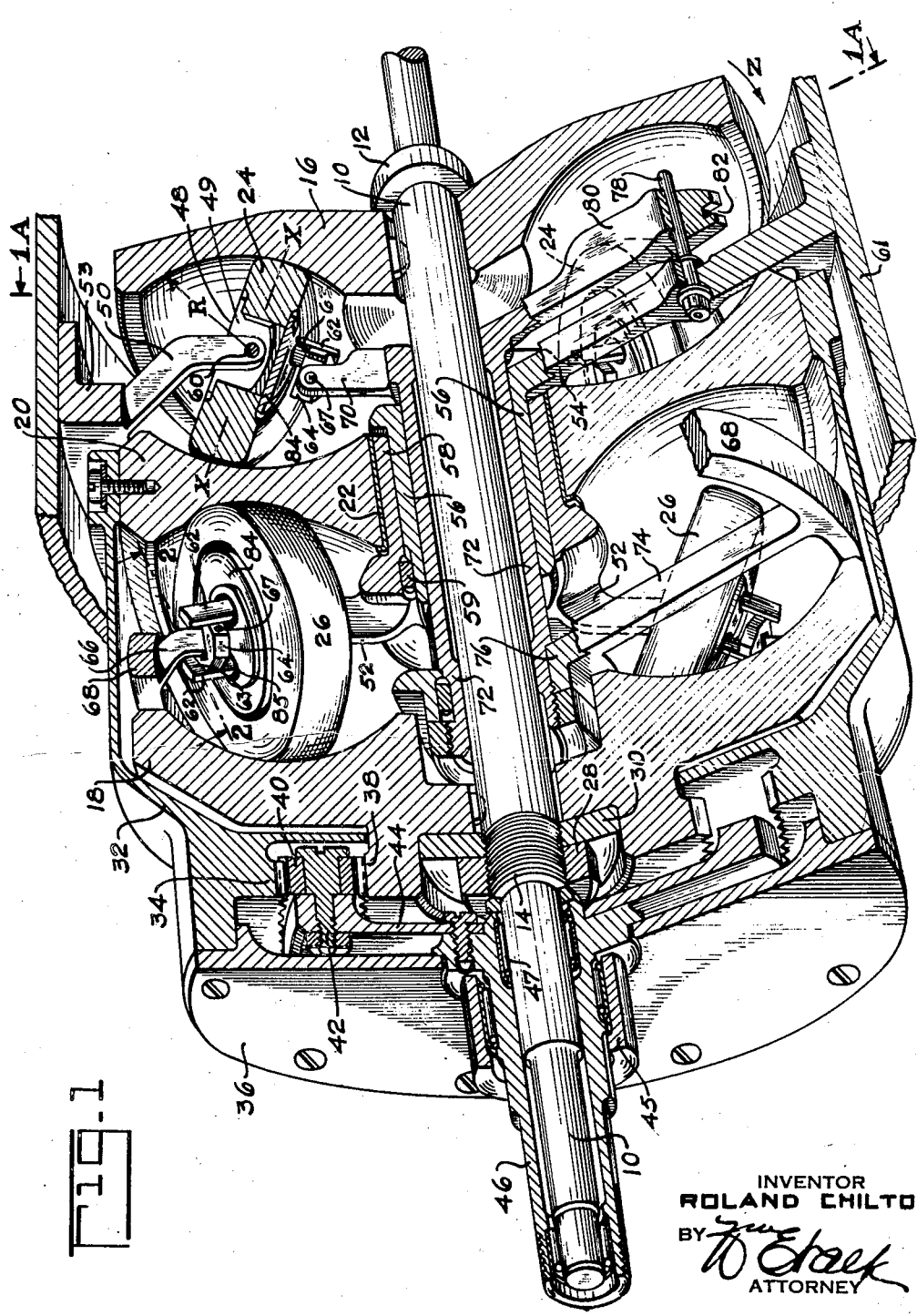
INVENTOR
ROLAND CHILTON
BY
ATTORNEY Jan. 3, 1950  R. CHILTON  2,493,571
TOROIDAL TRANSMISSION
Filed Oct. 6, 1944  3 Sheets-Sheet 2

INVENTOR.
ROLAND CHILTON.
BY
ATTORNEY

Jan. 3, 1950     R. CHILTON     2,493,571
TOROIDAL TRANSMISSION

Filed Oct. 6, 1944     3 Sheets-Sheet 3

INVENTOR.
ROLAND CHILTON
ATTORNEY

Patented Jan. 3, 1950

2,493,571

UNITED STATES PATENT OFFICE 2,493,571

TOROIDAL TRANSMISSION

Roland Chilton, Ridgewood, N. J., assignor to Allan Chilton and William E. Valk, both of Ridgewood, N. J., doing business as joint adventurers Application October 6, 1944, Serial No. 557.477

26 Claims. (Cl. 74—200)

My invention relates to variable speed transmissions and more particularly to transmissions wherein the speed ratio between opposed toroidal discs is progressively variable by means of rollers having a variable radius of driving contact therewith. By "radius of contact" is meant the radius of circular contact path of each roller with one of its associated toroidal discs, the radius of contact being variable by angulation of the rollers.

In the above type transmission, the toroidal discs are forced against the rollers to obtain tractive effort by a force known as the "contact load" and the ratio changing angulation of the rollers is effected while they are under this load. To this end the rollers are mounted for angulation on axes tangential to the pitch circle of the toroidal disc faces.

It is known in the art that the ratio changing motion of the rollers cannot be directly and frocibly produced by sliding them under their contact load. The plane of each roller is normally tangential to its contact paths on the associated discs and while this condition is maintained, the roller will be stabilized in a given ratio position. However, should the roller be displaced to a slightly off-tangential position, its contact path on the toroidal discs will depart from the normal circle and will become spiral, the pitch of which depends on the amount of off-tangency displacement of the roller. For example, should a roller running in tangential position on a toroidal disc contact circle, of say 20", circumference, be displaced to 1° off-tangency, the roller contact will precess radially of the disc approximately .35" per turn. At 10 revs./sec. disc speed, the roller contact will travel radially of the discs 3.5" per sec. Such radial shift of the roller will, in many cases, correspond to the entire ratio range of the transmission which would, accordingly, be covered in 1 sec. at the low rotational speed of 10 revs./sec. This is a faster rate of change than is generally necessary or desirable and, accordingly, it will be seen that the maximum off-tangency or "steering angle" required is small and will, in general, be less than 1°. However it is within the scope of this invention to provide larger "steering angles" if a faster rate of speed ratio change is desired.

In the prior art, where rollers have been mounted for this off-tangency displacement for steering them radially across the toroidal discs for speed ratio change, it has been the practice to mount the rollers on special pivots affording a relatively great freedom for steering pivotal movement, with the result that special means has been required to prevent the control from being operated so as to give an undesirably rapid rate of speed-ratio change. For instance, hydraulic controls and/or a small control wheel geared down to require a great number of turns to traverse the full ratio range have been used. It will be understood that while the overall ratio changing swing of the roller may amount to 30° or 40° yet the steering tilt (off-tangency) necessary to produce this angular movement in a few seconds is usually less than 1°. Nevertheless, in the prior art compound pivots and/or spherical bearings permitting much more than 1° steering tilt in the roller support have been provided.

I have found that where the roller journal is supported on a simple pin or pivot tangent to the toroidal pitch circle, the inherent looseness or transaxial play in such a pivot connection when constructed with normal clearance is sufficient to allow for the necessary small angle of steering tilt without extraneous pivot means. Where faster rate of ratio change is desired, one of the holes to which the pivot pin is fitted may be slightly bell-mouthed.

The forces exerted on each roller by its opposed toroidal discs are each tangential to the roller contact circles thereon and therefore the reaction force maintaining the roller in position relative to said discs is axial of the aforementioned roller mounting pivot pin. The preferred construction comprises a roller journal member, slotted to accommodate a supporting arm and pivoted thereto on a pin tangent to the toric pitch circle. Thus, the roller driving load reaction devolves on the abutting faces of the supporting arm and of the slot in the roller journal member and, according to a further provision of this invention, these slot faces are relieved to define a narrow contact zone extending slightly on each side of the midplane of the roller. With this construction, the roller driving force reaction exerted on its supporting arm tends to stabilize the roller against this narrow abutment in a position tangential to the toric pitch circle, and the roller must be rocked slightly against this roller stabilizing force in order to tilt the roller to initiate a ratio change. It thus results that the force required to produce a given rate of change is proportional to the roller driving force generated by the resulting acceleration or deceleration of the driven means. In other words, a relatively high rate of ratio change will be opposed by a relatively high roller stabilizing force so that greater effort on the control is needed to produce a greater rate of acceleration. This tends to stable operation and prevents sudden changes of speed whether by manual operation or by an automatic control device. In the case of manual control the operator will "feel" that the rate of speed change is proportional to the pressure applied, thus preventing jerky operation in the hands of the unskillful and making a smooth and progressive manipulation more or less instinctive.

The preferred form of transmission illustrated in the drawings is of the double-sided type employing two sets of rollers driving in parallel between a central disc and a pair of opposed end discs which latter discs are secured to rotate together with a main shaft. The transmission is contact-loaded by suitable axial pressure means between the shaft and the end discs by which the rollers are compressed between and against the three discs, the shaft comprising a tension member for this purpose. In fact the transmission may be contact loaded by an axial pressure proportional to the torque, e. g., as disclosed in my prior Patent No. 2,079,683.

It will be seen that in this double-sided transmission, the rollers of the two sets must pivot equally but in opposite directions in order that the driving ratio of each set of rollers shall be equal (though variable). One set of rollers in provided with an outer support frame and an inner control frame while the disposition is vice versa for the other set of rollers. These four frames are held against relative rotation while the control frames for the two sets of rollers are movable axially as a rigid unit to produce the off-tangency steering displacement and to follow up the resulting ratio changing precession of the rollers. A further feature of the invention consists of a novel control connection between the control frames and the rollers whereby these steering, precession and follow-up functions are effected.

The transmission is equipped with planet gears drivably connected between the center disc and the main shaft and mounted on the output member of the transmission whereby zero drive ratio and reverse drive ratios are obtainable, e. g., as fully described in my said prior Patent No. 2,079,683.

A further feature of applicant's invention lies in the fact that the control frames are restricted to axial control movements for tilting the rollers in order to effect a speed ratio change. In the prior art, tilting of the rollers is effected by a rotary movement of the control frame or frames and therefore, the spacing between adjacent rollers had to be sufficient to accommodate this rotary movement, whereas with only axial control movements, as in the present invention, the rollers may be disposed quite close together. For example, I am able to use four rollers between a pair of toroidal discs, where with the rotary control movement of the prior art only three rollers were possible.

Objects and advantages of the invention will be obvious from the foregoing and from the following description with reference to the drawing in which:

Figure 1 is a sectional perspective view of a transmission embodying the invention;

Figure 1A:
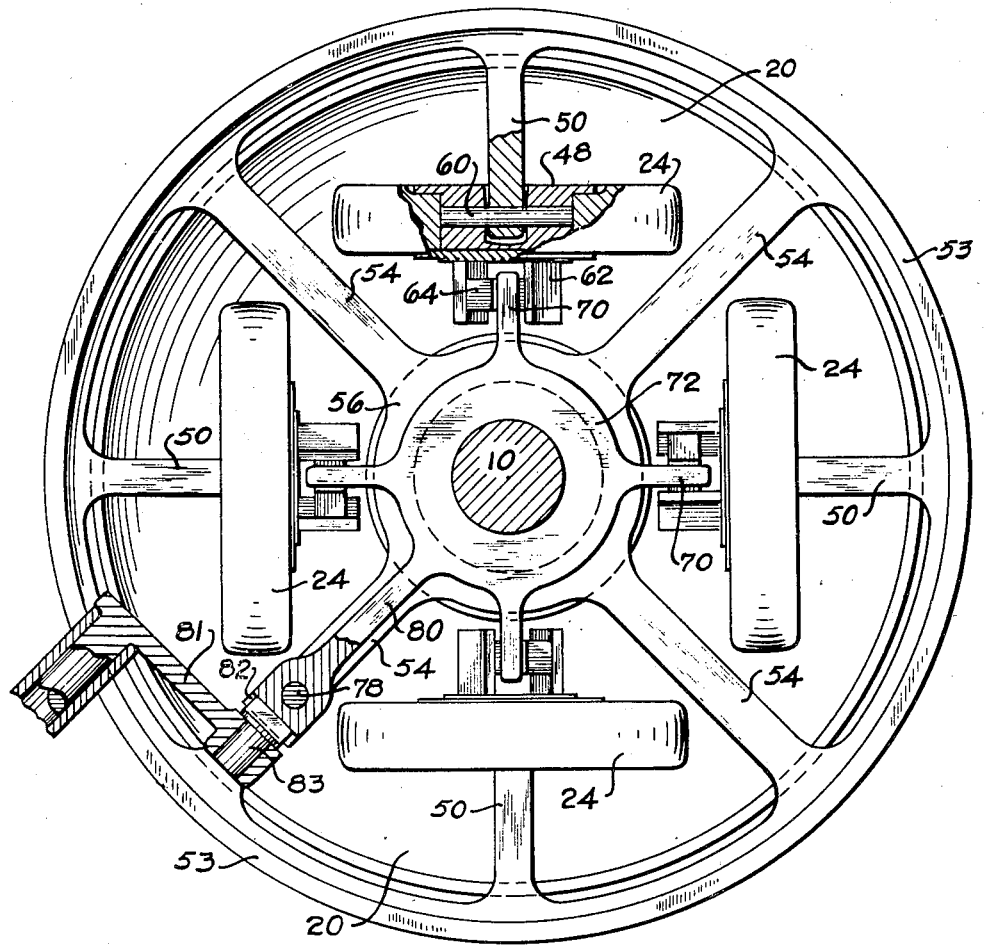
Figure 1A is a transverse view along line 1A—1A of Figure 1, but with the rollers disposed parallel to the axis of the transmission instead of being angulated thereto.

Referring first to Figures 1 and 1A, 10 designates a main drive shaft having a shoulder 12 and a screw thread 14. Abutting the shoulder 12 is an end disc 16 having a toroidal surface generated by rotation of a circular arc of radius R about the axis of shaft 10. A complementary end toric disc 18 is provided, and both discs are keyed to the shaft 10 for rotation therewith. Between these discs is a central double toric disc 20 rotatable on a bearing sleeve 22. The generating element of each toric surface is a circular arc of radius R and the generating arcs of facing toric surfaces have common centers. The locus of such common centers between each pair of facing toric surfaces is a circle which herein is termed a toric pitch circle. Between the central disc 20 and each end disc 16 and 18 and drivably engaging their opposed toric faces are sets of similar rollers 24 and 26 respectively, loaded into friction driving contact with the discs by a nut 28 and washer 30. Secured to the central disc 20 is a drum 32 at the left hand end of which a ring gear 34 is integrally formed and to which a cover plate 36 is secured. A sun gear 38 is formed integral with the left hand end disc 18. Planet pinions 40 are meshed with both the gears 34 and 38, and are mounted on trunnions 42 carried by a disc 44 rigid with a driven sleeve 46 supported by an external bearing 45 and piloted for rotation on suitable bearings 47 on the left hand end of the main shaft 10.

The rollers 24 and 26 are mounted on similar journal members or carriers 48 having transverse slots 49 which accommodate radially extending supporting arms 50 and 52 respectively. The arms 50 for the right hand set of rollers 24 extend inwardly from a rim 53 united by radial spokes 54 to a sleeve 56, and the arms 52 for the left hand set of rollers 26 extend outwardly from a sleeve 58 surrounding the sleeve 56 and held from rotation relative thereto by a key 59. The spokes 54 are disposed between the rollers 24 as best seen in Figure 1A and their rim 53 is connected to a fixed housing 61 within which the transmission is disposed, thereby preventing rotation of the rollers about the axis of the transmission. Instead of connecting the rim 53 directly to the housing 61, torque responsive means may be interposed therebetween for providing an axial contact load between the discs 16, 18 and 20 and their rollers proportional to the torque transmitted, e. g., as disclosed in my said prior patent.

Figure 2:
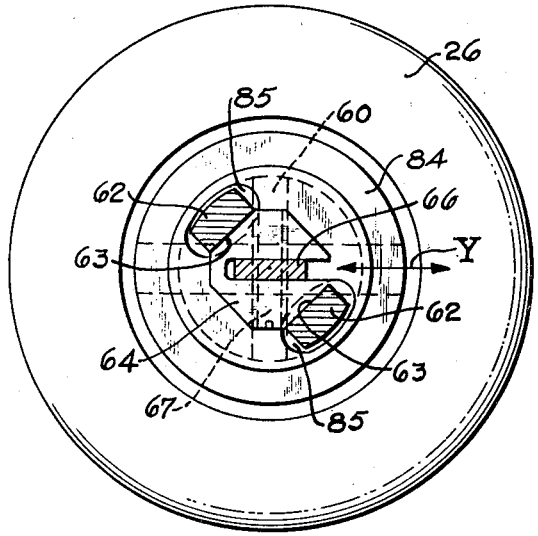
Figure 2 is a view taken along line 2—2 of Figure 1.

Hinge pins 60 pivotally mount the slotted roller journal members 48 on the arms 50 and 52, said hinge pins being disposed tangent to the toric pitch circles about which the opposed toric faces of discs 16 and 20 and discs 18 and 20 respectively are formed. Each of the rollers 24 and 26 has a diameter which is equal to twice the radius R of the circular generating arc of the toric surfaces. The roller journal members or carriers 48 each have a pair of projections 62 providing spaced opposed faces 63 disposed parallel to and on opposite sides of the axis of the associated roller carrier 48 and at an angle to the axis of the associated pivot pin 60, which angle, for example, is illustrated as 45°, as best seen in Figure 2. Slidably fitted between the parallel opposed faces 63 of each pair of projections 62 is a control block 64, slotted to receive control arms 66, extending radially inwardly from a control frame rim 68 in the case of the left hand set of rollers 26 and to receive control arms 70 extending radially outwardly from a control sleeve 72 in the case of the right hand set of rollers 24. The control frame rim 68 is rigidly united by radial spokes 74 to a hub 76 rigid with the control sleeve 72, the spokes 74 extending between the rollers 26 in a manner similar to the relative disposition of the rollers 24 and spokes 54. The control blocks 64 are pivoted to the control frame arms 66 or 70 by pivot pins 67 disposed parallel to the associated roller mounting pivot pin 60. The control sleeve 72 is fitted to slide axially within the carrier frame sleeve 56 and is guided against rotation during this motion by a pin 78 slidably engaging a control arm 80 extending from said control sleeve, said pin 78 being rigid with one of the support spokes 54 of the fixed rim 53. The relative angular disposition of the control projections 62, their control faces 63, control block 64 and the control arm 66 (or 70) is best seen in Figure 2 in which the path of movement of the control arm 66 is indicated by the double ended arrow Y which is parallel to the axis of shaft 10.

It will be seen that thte members 62, 64, 66 and 67 comprising the control connection of the left hand set of rollers 26 are disposed outboard of the rollers, whereas the members 62, 64, 67 and 70 comprising the control connection of the right hand set of rollers 24 are disposed inboard of the associated rollers so that unitary axial movement of the rigidly connected members 80, 72, 76, 74 and 68 comprising a composite control frame, will move the rollers 24 and 26 through equal ratio changing angles but in opposite directions.

The roller support arms 50 and 52 may be regarded as a rigid unitary structure connected by key 59 through the sleeves 58 and 56 (around which the center disc bearing 22 rotates) and through which the control sleeve 72 is free to be moved axially. The spokes 54 of the support frame pass between adjacent rollers 24 and the spokes 74 of the control frame 68 pass between adjacent rollers 26. The control arm 80, rigid with the control frame, is moved axially through suitable control means by a pivotally supported control lever 81 (illustrated only in Figure 1A) having a pivot pin 83 with a tongue portion engaged within a slot 82 in the outer end of the control arm 80.

Considering now only the two upper rollers 24 and 26 as illustrated in Figure 1, suppose that the control arm 80 is urged to the right with driving contact loads imposed upon the toroidal discs and rollers. Then it will be seen that the control block 64 of the upper roller 24 will press one of its associated projections 62 so as to urge the upper right hand roller 24 to rotate about its pivot pins 60 in a counter-clockwise direction whereas the control arm 66 and control block 64 will urge the upper roller 26 in a clockwise direction. Due to the heavy contact loads between the rollers and the associated toric surfaces engaged thereby, the rollers cannot respond to this urging. However, because of the angular disposition of the faces 63 of the projections 62, the rollers are also urged to tilt about axes through their points of contact with their opposed toric surfaces as the control arm 80 is urged to the right or left. As a result, when the control arm 80 is urged to the right, the upper roller 24 will be urged to tilt counter-clockwise about an $x$—$x$ axis passing through the points of contact of the roller with its opposed toric surfaces, as viewed leftward along this axis, and the upper roller 26 will be urged to tilt counter-clockwise about the axis passing through its points of contact with its opposed toric surfaces as viewed from the left in Figure 1. Sufficient looseness is provided by the fit of the pivot pin 60 in the arms 50 or 52 and by the fit of arms 50 or 52 in the slot in the journal member 48 to permit a slight tilt of the rollers 24 and 26 about individual axes passing through their points of contact on their opposed toric surfaces. As previously mentioned, the bore in the arms 50 or 52 for the pivot pins 60 may be slightly bell-mouthed to increase the looseness of the fit of the pins 60. For clarity this construction has been exaggerated at 60' in Figure 5. Corresponding looseness at the control pivot pins 67 is not essential since the inclination of the control faces 63 relative to the pivot pins 67 provides a universal joint action by rotation of the control blocks 64. This is true because this inclination is designed greater than the self locking friction angle of the contacting surfaces.

Accordingly, when the control arm 80 is urged to the right, each of the rollers 24 is tilted to an off-tangency position relatively to its associated toric pitch circle. That is, each roller 24 is tilted counter-clockwise about an individual axis passing through its points of contact with the toric surfaces as viewed from the left in Figure 1, whereby the rollers 24 will be steered from their normal circular paths of contact with their associated toric surfaces to precess along spiral paths thereon. The opposed discs 16 and 20 are rotating in opposite directions, and with the disc 16 rotating in the direction indicated by the arrow Z on Figure 1, this spiral path of speed-ratio changing precession of the rollers 24, resulting from movement of control arm 80 to the right, will be inwardly along the disc 16 and outwardly along the disc 20. Similarly, as a result of the control arm 80 being urged to the right, the rollers 26 tilt about axes through their points of contact with their opposed toric surfaces in a direction such that the resulting precession of the rollers 26 along spiral paths will be inwardly along disc 16 and outwardly along the disc 20. Thus upon movement of the control arm 80 the two sets of rollers 24 and 26 respectively rotate in opposite directions about their pivot pins 60. Obviously shift movement of control arm 80 to the left will result in speed-ratio changing precession of rollers 24 and 26 opposite to that resulting from shift movement of the control arm to the right.

This speed-ratio changing precession of the rollers 24 and 26 will persist as long as it is followed up by movement of the control arm 80 and the unitary control frame connected thereto. However, as soon as the control arm 80 is held stationary, the next increment of precession of the rollers 24 and 26 will remove the tilting pressure exerted by the control blocks 64 on their associated rollers through the projections 62, and any further precession is prevented by a resulting reversal of the tilting pressure, thereby restoring the rollers to a tangent disposition relative to their associated toric pitch circle, and as a result each roller stabilizes with a circular contact path on each of its associated toric surfaces. That is, with the control arm 80 locked, any incidental tendency of any roller to displace itself from a circular path to a spiral path on its associated toric surfaces is instantly corrected by the restoring force generated by the angular control faces 63.

In order that the rollers shall precess in a direction to remove the tilting pressure exerted by the control blocks on the roller journal projections 62, the hand or direction of the slope of the faces 63 of the control projections 62 must be correlated with the direction of rotation of the associated toric discs. The disposition of the control faces 63 illustrated in Figure 1 is appropriate for a direction of rotation of the end discs 16 and 18 indicated by the arrow $x$. Incidentally the upper roller 24 is shown in axial section in Figure 1 and therefore, only one of the control projections 62 is illustrated, the opposed companion projection 62 being above the plane of the section.

The rate at which the precession of the rollers takes place depends upon the angle through which the rollers are tilted by the displacement of the control arm 80, but it should be noted that this steering tilt persists only so long as the resulting ratio precession of the rollers is followed up by corresponding motion of the control arm. When the transmission is stationary and under contact load, the control lever is locked except for a very slight fore and aft motion corresponding to the slight degree of tilt permitted by the play in the roller mounting pivot pin 60. When the toric discs and rollers are rotating, however, and axial pressure is applied to the control arm 80, the arm moves in the direction of the applied control force so long, and only so long as the control force persists.

The control projections 62 are shown as integral with the journal members 48 on which the rollers are retained with minimum end play by a detachable plate 84 secured to the journal members 48 and provided with holes 85 to clear the projections 62. Obviously, however, the projections 62 could just as well be formed integral with the plates 84. The rollers of the left and right hand sets 26 and 24 are rotating in opposite directions and have their control projections 62 projecting on opposite sides. From this disposition it results that the hand of the slope of control faces 63 of the projections 62 is the same for both sets of rollers, i. e., the roller journal members 48 and control blocks 64 may be identical parts for any one pre-selected direction of rotation for the toroidal discs.

Figure 3:
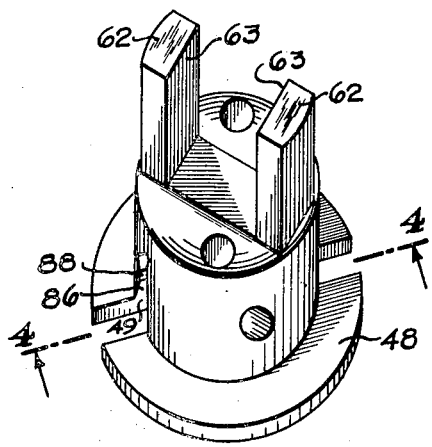
Figure 3 is a perspective view of one of the roller journals.
Figure 5:
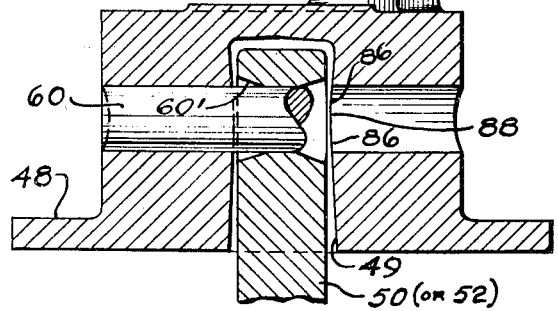
Figure 5 is a sectional view taken along line 5—5 of Figure 4.
Figure 4:
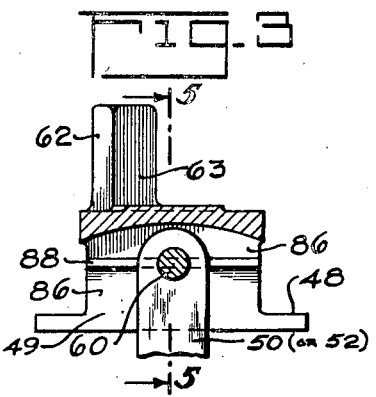
Figure 4 is a sectional view taken along line 4—4 of Figure 3.

Referring now to Figures 3-5 illustrating a roller journal or carrier 48, it will be seen that the sides of its slot 49 which accommodates a support arm 50 or 52 have been angularly relieved at 86 to provide a relatively narrow land or abutment face 88 central with the supporting pin 60. The driving load reaction force on each roller is exerted by its fixed supporting arm 50 or 52 to maintain the roller in a fixed position about the axis of the shaft 10 and this roller driving force reaction is exerted by the arm 50 or 52 against one of the narrow land or abutment faces 88 of the roller journal. This reaction force between a flat abutment face 88 of each roller and its supporting arm 50 or 52 stabilizes the roller tangent to its associated toric pitch circle. Therefore, in order to tilt the rollers for initiating a speed ratio changing precession of the rollers, it is necessary to apply sufficient tilting pressure to the roller control projections 62 to overcome the stabilizing effect of each roller driving-load reaction force against its flat abutment face 88. Accordingly, the shifting force required to be exerted against the control arm 80 for a speed ratio change bears a definite ratio to the magnitude of the driving load, which ratio may be varied by suitably proportioning the width of the stabilizing land or abutment face 88. With this construction, the operator can "feel" that the rate of speed change is proportional to the magnitude of the pressure applied to the control arm 80.

Figure 6:
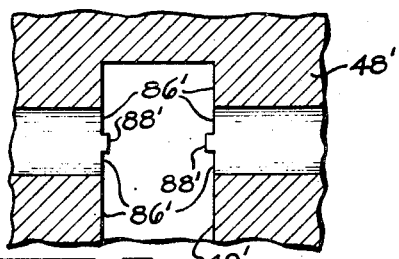
Figure 6 is a view of a slight modification of the construction illustrated in Figure 5.

In Figure 5 the clearances between the support arm 50 or 52 and the walls of the slot 49 have been greatly exaggerated to help bring out the nature of the abutment faces 88. Figure 6 illustrates a roller journal member 48' which is a slight modification of the roller journal member 48 and similar parts have been indicated by similar but primed reference numerals. In Figure 6 the slot 49' is provided with an abutment face 88', the sides of which are abruptly cut back as indicated at 86' instead of being angularly relieved as in Figure 5. The roller stabilizing effect of the roller driving load reaction between the roller support arms and their associated abutment faces is identical in Figures 5 and 6, but Figure 5 is the more practical arrangement while Figure 6 illustrates the effect of the abutment faces more clearly.

Referring again to Figure 1, in the position shown, the drive ratio between the roller contacts is the same as the drive ratio between the planetary sun gear 38 and annular gear 34, i. e., in this position the variable ratio is equal to the planetary ratio under which condition the planet carrier 44 and driven sleeve 46 are held stationary regardless of the speed of revolution of the main shaft 10 and input discs 16 and 18, i. e., the transmission is in zero ratio. Control movement of the rollers towards greater angularity than shown will result in the driven member 46 rotating in the same direction as the discs 16 and 18, whereas angulation in the other direction will result in the opposite rotation of the driven member 46. With the proportions shown, an overall ratio of 1:1 is obtained with minimum radius contact on the middle disc 20 and maximum radius on the end discs 16 and 18 while a ratio of about ⅓ in the opposite direction is afforded at the opposite extreme of the roller movement. Thus, by progressive movement of the control from one extreme to the other, the transmission goes from 1:1 progressively to zero ratio and therethrough into the opposite direction of rotation of the driven member. Attention is again directed to my prior Patent No. 2,079,683 for a more detailed description of this general operation whereby the transmission is shiftable from a drive in one direction through zero ratio to a drive in the reverse direction.

As described the facing toroidal surfaces preferably have a common pitch circle. However, in some prior art toroidal transmissions—such as disclosed in Patent No. 1,856,249 to F. A. Hayes— the pitch circles of the facing toroidal surfaces are displaced slightly relative to each other. The amount of this displacement is small so that the expression "common pitch circle" in the appended claims is intended to be sufficiently broad to cover such slightly displaced pitch circles.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a variable speed transmission, a pair of discs having facing co-axial toric surfaces with a common toric pitch circle, a plurality of circumferentially spaced rollers disposed in driving engagement with the toric surfaces of said discs, means supporting each roller for speed-ratio-changing pivotal movement about individual axes tangent to said toric pitch circle, and control means operatively connected to said rollers and movable parallel to the axis of said toric surfaces for tilting each roller about individual axes passing through the points of contact of said rollers with said toric surfaces, said control means comprising a hub member and a rim member respectively disposed inwardly and outwardly of said rollers, and substantially radial arms extending between said rollers for interconnecting said rim and hub members.

2. In a transmission, a member, a roller disposed in driving contact with a surface of said member, a journal member for said roller, a support for said roller and journal member, and a pin carried by said support with its axis disposed at right angles to the axis of said journal member, said pin pivotally connecting said journal member to said support for speed-ratio-changing pivotal movement about the axis of said pin, the fit of said pin being sufficiently loose for tilting of said roller about an axis at right angles to the axis of said pin and roller journal member.

3. In a transmission, a member, a roller disposed in driving contact with a surface of said member, a journal member for said roller having a slot, a support for said roller extending within said slot, and a pin extending across said slot at right angles to the axis of said journal member and connecting said journal member to said support for pivotal movement about the axis of said pin, the fit of said pin being sufficiently loose for tilting said roller about an axis at right angles to the axes of said pin and journal member.

4. In a variable speed transmission, a pair of discs having facing co-axial toric surfaces, a plurality of rollers disposed in driving engagement with the toric surfaces of said discs, a journal member for each roller, a support for each roller journal member, a pivot pin for each journal member, each of said pivot pins connecting its associated journal member with its support for speed-ratio-changing pivotal movement of its roller about the axis of its associated pin the inherent lateral looseness of the fit of each of said pivot pins permitting tilting of their associated rollers about individual axes through the points of contact of each roller with said toric surfaces, and means for effecting such tilting of each said roller.

5. In a variable speed transmission, a pair of discs having facing co-axial toric surfaces with a common toric pitch circle, a plurality of circumferentially spaced rollers disposed in driving engagement with the toric surfaces of said discs, a journal member for each roller having a slot, a support for each roller comprising an arm extending within the slot of the associated roller journal member, a plurality of pivot pins, one for each roller, each of said pins being disposed tangent to said toric pitch circle and pivotally connecting its roller journal member with its associated support arm, the inherent lateral looseness of the fit of each of said pivot pins permitting tilting of their associated rollers about individual axes through the points of contact of each roller with said toric surfaces, and means for effecting such tilting of each said roller.

6. In combination, a pivotally mounted roller carrier member, a control member therefor, a unitary block, and a pin pivotally mounting said block on one of said members about an axis substantially parallel to the pivot axis of said roller carrier member, said block being engageable with a surface on the other of said members inclined to said axes.

7. A push-pull connection between a first member mounted for pivotal movement and a second member movable along a linear path, said connection comprising a pair of parallel surfaces on one of said members and inclined both to the pivot axis of said pivotal movement and to said linear path, a block fitted to said surfaces, and a pin pivotally securing said block to the other of said members about an axis substantially parallel to said first mentioned pivot axis.

8. In a transmission, a member, a roller in driving engagement with a surface of said member, a pivotally mounted journal member for said roller, and control means connected to said journal member for tilting said roller about an axis at right angles to the axis of said journal member and its pivot axis, said connection including means restrained to pivotal movement about an axis parallel to the pivot axis of said journal member.

9. In a variable speed transmission, a pair of discs having facing co-axial toric surfaces, a plurality of rollers disposed in driving engagement with the toric surfaces of said discs, a journal member for each roller, means supporting each roller journal member for speed-ratio-changing pivotal movement across said toric surfaces, control means operatively connected to each roller journal member and movable parallel to the axis of said toric surfaces for tilting each roller about individual axes passing through points of contact of said rollers with said toric surfaces, each said connection including means restrained for pivotal movement by said control means about an axis substantially parallel to the pivot axis of and engageable with its associated roller journal member to effect said tilting upon axial movement of said control means.

10. In a variable speed transmission, a pair of discs having facing co-axial toric surfaces with a common toric pitch circle, a plurality of circumferentially spaced rollers disposed between and in driving engagement with the toric surfaces of said discs, a journal member for each roller, means supporting each roller journal member for speed-ratio-changing pivotal movement about individual axes tangent to said toric pitch circle, and means for tilting each of said rollers about individual axes passing through the points of contact of said rollers with said toric surfaces, said means comprising a pair of surfaces formed on each of said roller journal members disposed parallel to the associated roller axis of said journal member and inclined relative to the pivot axis of said journal member, a plurality of unitary members each fitted between a pair of said surfaces, a control member movable parallel to the axis of said toric surfaces, and a plurality of pins pivotally connecting said unitary member to said control surfaces about individual axes parallel to the pivot axes of their associated journal members.

11. In a variable speed transmission comprising a pair of discs having facing co-axial toric surfaces, a plurality of circumferentially spaced rollers disposed in driving engagement with said surfaces, a journal member for each roller, a pivot pin supporting each roller journal member for speed-ratio-changing pivotal movement of its roller across said toric surfaces about the axis of its associated pin, the fit of said pivot pins being sufficiently loose for tilting of their associated roller journal members about individual axes through the points of contact of each roller with said toric surfaces, and control means having a plurality of surfaces each respectively engageable with a surface on one of said journal members for applying a roller tilting force thereto, at least one surface of each pair of said engageable surfaces being inclined to the pivot axis of the associated journal member.

12. In a transmission, a member, a roller in driving engagement with the surface of said member, means operable to tilt said roller for steering said roller across said surface, and roller supporting means comprising abutment faces urged together by the roller driving force reaction and arranged so that, upon roller tilt, said roller is urged back to its untilted position with a force dependent on the magnitude of the roller driving load.

13. In a variable speed transmission, a pair of discs having facing co-axial toric surfaces, a plurality of rollers disposed in driving engagement with said surfaces, means operable to tilt each of said rollers about individual axes through the points of contact of each roller with said surfaces, and roller supporting means arranged so that, upon tilt of said rollers, each roller is urged back to its untilted position with a force dependent on the magnitude of the roller driving load.

14. In a variable speed transmission, a pair of discs having facing co-axial toric surfaces, a plurality of circumferentially spaced rollers disposed in driving engagement with said discs, means supporting each of said rollers for speed-ratio-changing pivotal movement across said toric surfaces and for tilting movement about individual axes through the points of contact of each roller with said toric surfaces, and means movable to effect said tilting movement, said roller supporting means comprising flat abutment faces urged together by the roller driving force reaction and arranged so that upon roller tilt said faces are tilted relative to each other.

15. In a variable speed transmission comprising a pair of discs having facing toric surfaces with a common toric pitch circle, a plurality of rollers disposed in driving engagement with the toric surfaces of said discs, a journal member for each roller having a slot, a support for each roller comprising an arm extending within said slot, a pivot pin for each roller disposed tangent to said toric pitch circle and pivotally connecting its associated journal member and supporting arm, said arm and slot having an elongated flat contact zone subjected to the roller driving force reactions, each of said elongated contact zones being disposed parallel to a line through the points of contact of its associated roller with its toric surfaces and the sides of each associated arm and slot having clearance on both sides of said zone.

16. In a variable speed transmission comprising a pair of discs having facing co-axial toric surfaces, a plurality of rollers disposed in driving engagement with the toric surfaces of said discs, a journal member for each roller, a support for each journal member arranged for speed-ratio-changing pivotal movement of each roller across said toric surfaces, and for tilting of each roller about individual axes passing through the points of contact of each roller with said toric surfaces, each said support and roller journal member having flat engaging faces subjected to the roller driving load reactions wherery the driving load reaction exerted against said engaging faces tends to stabilize each said roller against said tilting movement with a force proportional to the magnitude of said driving load reaction.

17. In a variable speed transmission comprising a pair of discs having facing co-axial toric surfaces with a common toric pitch circle, a plurality of circumferentially spaced rollers disposed between and in driving engagement with the toric surfaces of said discs, a journal member for each roller having a slot, a support for each roller comprising an arm extending within the slot of the associated roller journal member, a pivot pin for each roller disposed tangent to said toric pitch circle, each of said pivot pins extending across the slot in its associated journal member and pivotally connecting its associated journal member and supporting arm, said arm and slot having an elongated flat contact zone subjected to the roller driving force reactions, each of said elongated contact zones being disposed parallel to the tilt axes of its associated roller and the sides of the associated arm and slot having clearance on both sides of said zone, said clearance and inherent lateral looseness of the fit of each of said pivot pins permitting tilting of their associated rollers about individual axes through the points of contact of each roller with said toric surfaces.

18. In a roller and disc transmission, a first roller, control means spaced to one side of said roller, a second roller and control means wherein the control means is spaced to the opposite side of said second roller, and a unitary control frame engaging said control means and movable to pivot the rollers equally but in opposite directions.

19. In a transmission, co-axial disc formed toroidally about a pair of pitch circles of given radius, two sets of pivots disposed at said radius, roller carriers mounted on said pivots, a control frame connected at greater and lesser radii with the carriers of respective sets, each connection including pivot means parallel to the associated mounting pivot, said control frame being movable to pivot said roller carrier equally but in opposite directions.

20. In a variable speed transmission comprising a pair of discs having facing toric surfaces, a plurality of circumferentially spaced rollers disposed between and in driving engagement with said discs, a set of roller support arms, each of said arms respectively supporting one of said rollers for speed-ratio-changing pivotal movement across said toric surfaces and for tilting about an individual axis through its points of contact with said toric surfaces, a set of control arms, each of said control arms respectively being operatively connected to one of said rollers and being adapted to effect said roller tilting, said sets of arms respectively extending in opposite directions from said rollers.

21. In a variable speed transmission, driving and driven means comprising two pairs of facing toric surfaces, said toric surfaces being co-axial and each pair having a common toric pitch circle, the end toric surfaces being formed on one of said means and the intermediate toric surfaces being formed on the other of said means, a set of rollers disposed between and in driving engagement with each pair of toric surfaces, a journal member for each roller, the journal members for each set of rollers being mounted for pivotal movement about individual axes tangent to their associated toric pitch circle and for tilting about individual axes through the points of contact of their associated rollers and the toric surfaces engaged thereby, and control means operatively connected to said journal members for effecting said roller tilting, said control means being operatively connected adjacent the inner end of one set of journal members and being operatively connected adjacent the outer end of the other set of journal members.

22. In a variable speed transmission, an intermediate member having oppositely facing toric surfaces, a pair of end member co-axial with said intermediate member and disposed on opposite sides thereof, said end members each respectively having a toric surface facing one of the toric surfaces of said intermediate member, a set of circumferentially spaced rollers disposed in driving engagement with each facing pair of toric surfaces, the rollers of each set being supported for speed-ratio-changing pivotal movement across their engaged toric surfaces and for tilting about individual axes through their points of contact with their engaged toric surfaces, a support frame for said rollers comprising hub and rim portions interconnected by spokes passing between one set of said rollers and having roller support arms extending inwardly from the rim portion to said one set of rollers and extending outwardly from the hub portion to the other set of rollers, and a control frame movable to tilt said rollers, said control frame comprising rim and hub portions interconnected by spokes passing between said other set of said rollers and having control arms operatively connected to each roller, said control arms extending outwardly from said hub portion to said one set of rollers and extending inwardly from said rim portion to said other set of rollers.

23. In a variable speed transmission, an intermediate member having oppositely facing toric surfaces, a pair of end members co-axial with said intermediate member and disposed on opposite sides thereof, said end members respectively having a toric surface facing one of the toric surfaces of said intermediate member, a set of rollers disposed in driving engagement with each facing pair of toric surfaces, the rollers of each set being mounted for speed-ratio-changing pivotal movement across their engaged toric surfaces and for tilting about individual axes through their points of contact with their engaged toric surfaces, and means axially slidable through the hub of said intermediate member for effecting said roller tilting.

24. In a variable speed transmission, an intermediate member having oppositely facing toric surfaces, a pair of end members co-axial with said intermediate member and disposed on opposite sides thereof, said end members each respectively having a toric surface facing one of the toric surfaces of said intermediate member, a set of rollers disposed in driving engagement with each facing pair of toric surfaces, the rollers of each set being mounted for speed-ratio-changing pivotal movement across their engaged toric surfaces and for tilting about individual axes through their points of contact with their engaged toric surfaces, and a unitary control frame operatively connected to respective sets of rollers adjacent opposite sides thereof and being axially slidable to tilt said rollers and effect equal but opposite speed-ratio-changing pivotal movement of said sets of rollers.

25. In a variable speed transmission, a pair of discs having facing co-axial toric surfaces with a common toric pitch circle, a plurality of circumferentially spaced rollers disposed between and in driving engagement with said surfaces, a supporting structure for said rollers, a plurality of pins each carried by said supporting structure tangent to said toric pitch circle for respectively supporting one of said rollers for speed-ratio-changing pivotal movement about the axis of its associated pin, the fit of said pins being sufficiently loose for tilting of their respective rollers about individual axes through the points of contact of each roller with said toric surfaces, and control means operable to effect such tilting of said rollers.

26. In a variable speed transmission, co-axial discs forming two pairs of facing toric surfaces, two sets of circumferentially spaced rollers, the rollers of each set being disposed in driving engagement between the toric surfaces of a pair of said discs, means for supporting each roller for speed-ratio-changing pivotal movement relative to said toric surfaces, and a control frame adapted to tilt said rollers about individual axes through the points of contact of said rollers with their toric surfaces, said frame being operatively connected to respective sets of rollers adjacent opposite sides thereof such that movement of said control frame effects pivotal movement of the rollers of one set in one direction and equal but opposite pivotal movement of the rollers of the other set.

ROLAND CHILTON.

REFERENCES CITED

The following references are of record in the file of this patent:

UNITED STATES PATENTS

| Number | Name | Date |
|---|---|---|
| 1,774,175 | Erban | Aug. 26, 1930 |
| 1,903,228 | Thomson | Mar. 28, 1933 |
| 1,947,044 | Gove | Feb. 15, 1934 |
| 2,108,082 | Sharpe | Feb. 15, 1938 |
| 2,113,638 | Almen | Apr. 12, 1938 |

FOREIGN PATENTS

| Number | Country | Date |
|---|---|---|
| 415,922 | Great Britain | Sept. 6, 1934 |